(12) United States Patent
Li

(10) Patent No.: US 10,599,630 B2
(45) Date of Patent: Mar. 24, 2020

(54) ELIMINATION OF LOG FILE SYNCHRONIZATION DELAY AT TRANSACTION COMMIT TIME

(71) Applicant: Oracle International Corporation, Redwood Shores, CA (US)

(72) Inventor: Yunrui Li, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 874 days.

(21) Appl. No.: 14/726,133

(22) Filed: May 29, 2015

(65) Prior Publication Data

US 2016/0350353 A1 Dec. 1, 2016

(51) Int. Cl.
*G06F 16/23* (2019.01)

(52) U.S. Cl.
CPC ...... *G06F 16/2358* (2019.01); *G06F 16/2365* (2019.01); *G06F 16/2379* (2019.01)

(58) Field of Classification Search
CPC ......... G06F 17/30368; G06F 17/30371; G06F 17/30185; G06F 16/273; G06F 16/2343; G06F 16/2365; G06F 16/2336; G06F 16/2358; G06F 16/275; G06F 16/283
USPC .................................. 707/644, 648
See application file for complete search history.

(56) References Cited

U.S. PATENT DOCUMENTS

| | | | |
|---|---|---|---|
| 5,452,430 A | 9/1995 | Dievendorff et al. | |
| 5,452,445 A | 9/1995 | Hallmark et al. | |
| 5,485,608 A | 1/1996 | Lomet et al. | |
| 5,499,367 A | 3/1996 | Bamford et al. | |
| 5,524,205 A | 6/1996 | Lomet et al. | |
| 5,737,601 A | 4/1998 | Jain et al. | |
| 5,796,934 A | 8/1998 | Bhanot et al. | |
| 5,806,075 A | 9/1998 | Jain et al. | |
| 5,828,821 A | 10/1998 | Hoshina et al. | |
| 5,832,516 A | 11/1998 | Bamford et al. | |
| 5,832,521 A | 11/1998 | Klolts et al. | |
| 5,848,405 A | 12/1998 | Norcott et al. | |
| 5,850,507 A | 12/1998 | Ngai et al. | |
| 5,852,818 A | 12/1998 | Guay et al. | |
| 5,870,743 A | 2/1999 | Cohen et al. | |
| 5,889,988 A | 5/1999 | Depledge et al. | |

(Continued)

OTHER PUBLICATIONS

Tianzheng et al., "Scalable Logging through Emerging Non-Volatile Memory" Proceddings of the VLDB Endowment, vol. 7, No. 10, dated Jun. 1, 2014, 12 pages.

(Continued)

*Primary Examiner* — James Trujillo
*Assistant Examiner* — Fariborz Khoshnoodi
(74) *Attorney, Agent, or Firm* — Hickman Palermo Becker Bingham LLP

(57) ABSTRACT

A method and apparatus for elimination of log file synchronization delay at transaction commit time is provided. One or more change records corresponding to a database transaction are generated. One or more buffer entries comprising the one or more change records are entered into a persistent change log buffer. A commit operation is performed by generating a commit change record corresponding to the database transaction and entering a commit buffer entry comprising the commit change record into the persistent change log buffer. The commit operation returns without waiting for the commit change record to be recorded in a change record log file.

18 Claims, 3 Drawing Sheets

(56) References Cited

U.S. PATENT DOCUMENTS

| | | | |
|---|---|---|---|
| 5,903,898 A | 5/1999 | Cohen et al. | |
| 5,933,593 A | 8/1999 | Arun et al. | |
| 5,946,700 A | 8/1999 | Pongracz et al. | |
| 5,956,704 A | 9/1999 | Gautam et al. | |
| 5,996,088 A | 11/1999 | Frank et al. | |
| 6,026,406 A | 2/2000 | Huang et al. | |
| 6,041,423 A | 3/2000 | Tsukerman | |
| 6,055,546 A | 4/2000 | Pongracz et al. | |
| 6,078,930 A | 6/2000 | Lee et al. | |
| 6,108,654 A | 8/2000 | Chan et al. | |
| 6,125,368 A | 8/2000 | Bridge et al. | |
| 6,182,241 B1 | 1/2001 | Ngai et al. | |
| 6,185,577 B1 | 2/2001 | Nainani et al. | |
| 6,205,449 B1 * | 3/2001 | Rastogi | G06F 11/1471 |
| 6,243,702 B1 | 6/2001 | Bamford et al. | |
| 6,253,212 B1 | 6/2001 | Loaiza et al. | |
| 6,295,610 B1 | 9/2001 | Ganesh et al. | |
| 6,351,754 B1 | 2/2002 | Bridge, Jr. et al. | |
| 6,353,836 B1 | 3/2002 | Bamford et al. | |
| 6,397,352 B1 | 5/2002 | Chandrasekarn et al. | |
| 6,411,968 B2 | 6/2002 | Bamford et al. | |
| 6,487,641 B1 | 11/2002 | Cusson et al. | |
| 6,493,726 B1 | 12/2002 | Ganesh et al. | |
| 6,507,853 B2 | 1/2003 | Bamford et al. | |
| 6,510,421 B1 | 1/2003 | Ganesh et al. | |
| 6,542,854 B2 | 4/2003 | Yang et al. | |
| 6,732,124 B1 | 5/2004 | Koseki et al. | |
| 7,039,733 B2 | 5/2006 | Hu et al. | |
| 8,429,134 B2 * | 4/2013 | Chan | G06F 11/1469 |
| | | | 707/678 |
| 8,725,782 B2 * | 5/2014 | Starks | G06F 16/1805 |
| | | | 707/822 |
| 8,793,223 B1 * | 7/2014 | Cho | G06F 11/1076 |
| | | | 707/690 |
| 9,477,557 B2 * | 10/2016 | Larson | G06F 11/1471 |
| 9,634,951 B1 * | 4/2017 | Hunt | H04L 47/50 |
| 2003/0204534 A1 * | 10/2003 | Hopeman | G06F 16/284 |
| 2004/0148316 A1 | 7/2004 | Bridge et al. | |
| 2006/0020634 A1 * | 1/2006 | Huras | G06F 16/2358 |
| 2012/0254120 A1 | 10/2012 | Fang et al. | |
| 2014/0279917 A1 * | 9/2014 | Minh | G06F 16/13 |
| | | | 707/648 |
| 2019/0121657 A1 * | 4/2019 | Kim | G06F 3/0604 |
| 2019/0236081 A1 * | 8/2019 | Park | G06F 16/2343 |

OTHER PUBLICATIONS

Shen Gao et al., "PCMLogging: Reducing Transaction Logging Overhead with PCM", Proceedings of the 20th ACM Conference on Information and Knowledge Management CIKM, dated 2011, 4 pages.

Ru Fang et al., "High Performance Database Logging Using Storage Class Memory", Data Engineering (ICDE), dated 2011, IEEE, 12 pages.

Pelley Steven et al., "Storagement Management in the NVRAM Era", Proceedings of the VLDB Endowment, ACM, vol. 7, No. 2, dated Oct. 1, 2013, 12 pages.

Arulraj et al., "Let's Talk About Storage and Recovery Methods for Non-volatile Memory Database Systems", Proceedings of the 2015 ACM Sigmod International Conference dated May 27, 2015, 12 pages.

Oracle8 Server Concepts, Release 8.0, dated Jun. 1997, pp. 1-27, 24-27.

Srivastava, U.S. Appl. No. 15/482,225, filed Apr. 7, 2017, Office Action, dated Sep. 3, 2019.

* cited by examiner

ELIMINATION OF LOG FILE SYNCHRONIZATION DELAY AT TRANSACTION COMMIT TIME

FIELD

Embodiments described herein relate generally to databases, and more specifically, to techniques for elimination of log file synchronization delay at transaction commit time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

ACID (Atomicity, Consistency, Isolation, Durability) is a set of properties that guarantee that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

Write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

In one approach, the modifications are recorded as change records. The change records are generated in-memory by a process executing a transaction, and are copied into one or more in-memory change log buffers. Multiple processes executing transactions may concurrently generate the change records into corresponding change log buffers. One or more writer processes gather the change records from the in-memory change log buffers and write them out to a persistent change log file on disk. The change records are cleared from the in-memory change log buffers after they are persisted to disk. When a writer process gathers change records from a particular region of an in-memory change log buffer, it needs to wait for and synchronize with activity from any process that is writing into the same region.

When a transaction commits, because write-ahead logging requires the change records to be persisted before applying the corresponding changes to the database, the writer process must write any remaining change records for the transaction from the corresponding in-memory change log buffer to the persistent change log file. A commit change record is also generated to indicate the end of the transaction.

When a transaction commits, the process executing the transaction needs to wait for writer process to gather and write the corresponding commit change record to the persistent change log file. The process executing the transaction must also wait for the writer process to gather and write other change records for the transaction. If the transaction depends on other transactions, the writer process must also gather and write the change records of the other transactions. Furthermore, the writer process must wait for any other process that is modifying a corresponding regions of the in-memory change log buffer. Collectively, these delays during transaction commit is referred to as a log file synchronization delay. Log file synchronization delay is one of the top delays in many OLTP workloads. The physical disk I/O performed by the writer process is a major time component of performing the commit operation.

Log file synchronization delay is increased when, to achieve maximum concurrency across multiple concurrent database transactions, writing to the change log file is synchronized. Change records for the multiple transactions may be copied into multiple in-memory change log buffers concurrently to reduce contention. One writer process synchronizes the copying from multiple change log buffers into the persistent change log file. Thus, when one transaction commits, the log file synchronization delay may involve waiting for ongoing change record generation into multiple regions of one or more change log buffers to finish, even if the region is not related to the committing transaction.

One approach involves storing the log files in non-volatile memory instead of on disk storage. This reduces the I/O time of writing to the log file. However, this does not address the issue of log file synchronization delay, which is still present. While such scheme makes each individual redo write faster, it doesn't remove log file synchronization wait at transaction commit time.

Thus, there is a need for elimination of log file synchronization delay at transaction commit time.

DETAILED DESCRIPTION

Figure 1:
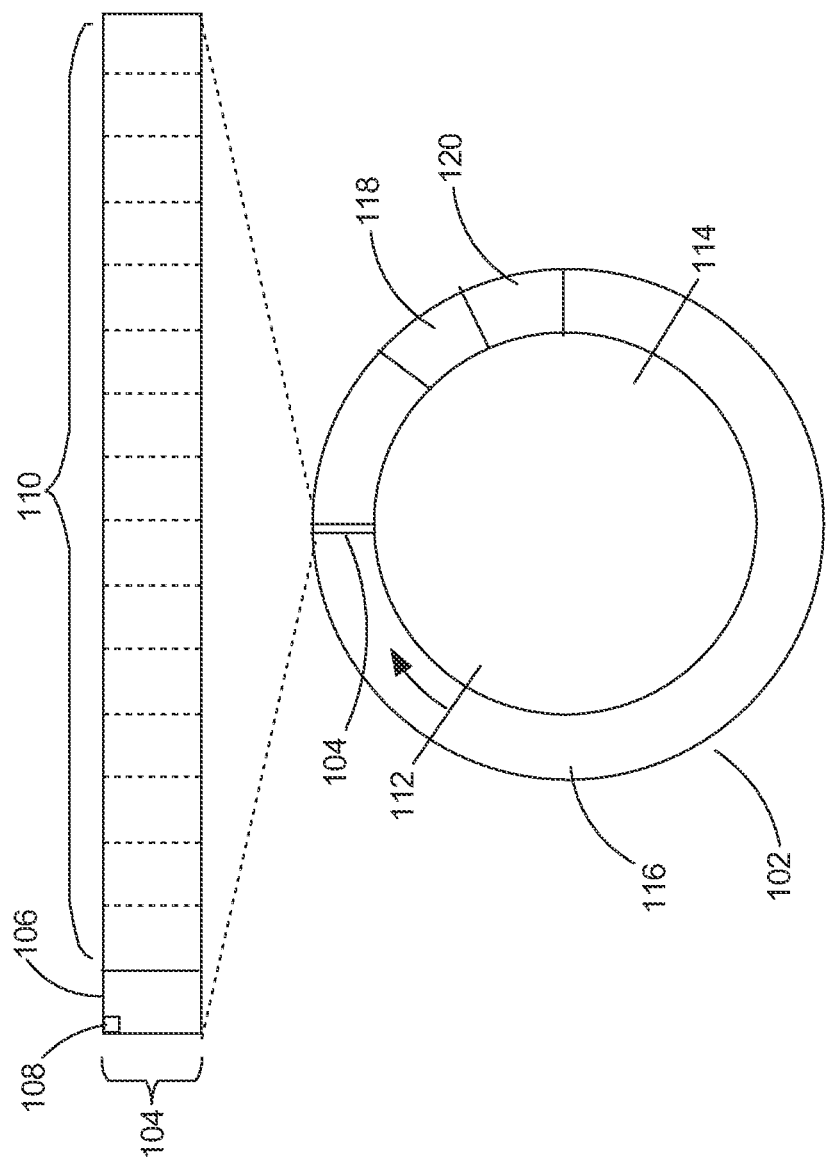
FIG. 1 is a block diagram depicting an embodiment of a persistent change log buffer.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for elimination of log file synchronization delay at transaction commit time. Processes that execute transactions enter change records directly into one or more persistent change log buffers. The persistent change log buffers are allocated in non-volatile memory. Change records copied into the persistent change log buffer are persistent as soon as the change record is placed into the persistent change log buffer.

In one embodiment, the persistent change log buffer in non-volatile memory replaces an in-memory change log buffer in a write-ahead logging mechanism of a database system. As used herein, the term "in-memory" refers to the storing of data in a main memory of a computer, such as in volatile random-access memory (RAM). As used herein, the term "non-volatile memory" refers to any computer memory from which stored information may be retrieved after power to the computer memory has been turned off and on. Non-volatile memory may include but is not limited to flash memory, magneto-resistive memory devices, ferroelectric memory devices, magnetic storage devices and optical storage devices. In an embodiment, non-volatile memory includes any byte-addressable memory that can accessed either natively or via fast interconnect by nodes within a database system.

Change records are generated into the persistent change log buffer such that each change record independently becomes durable without waiting for other concurrent redo generation. No synchronization is required between different processes that generate change records and write to the same persistent change log buffer. The change records may be further processed, such as by writing from the persistent change log buffer to change log files on disk. The change records may be written to the change log files in a deferred manner. The deferred write is decoupled from redo generation and transaction commit because persistence of the change record is already ensured upon entry into the persistent change log buffer. The term deferred refers to the fact that a transaction commit can return before the deferred writer process writes the change record from the buffer to disk. Thus, log file synchronization delay is eliminated. The deferred writer process can process the persistent change log buffer in a desynchronized manner with respect to redo generation.

In one embodiment, the change records are generated into the persistent change log buffer in a format that allows the change records to be archived into the change log files on disk without the need to reformat. As used herein, the terms "disk" and "disk storage" refer to any magnetic, optical, or mechanical drive intended for persistent storage, including solid state disk drives that are diskless but which include traditional block I/O interfaces.

Log file synchronization delay is eliminated at transaction commit time because change records are immediately persisted into the persistent change log buffer. Thus, write-ahead logging is possible even with a deferred log file write to disk. A transaction commit can be acknowledged before the change record is written to the log file, thereby eliminating log file synchronization delay. Thus, transaction commit latency is minimized to the cost of transferring the commit change record to the persistent change log buffer. Elimination of log file synchronization delay has the potential to significantly increase throughput for OLTP workloads.

In one embodiment, a persistent change log buffer is configured to allow multiple processes to write to the non-volatile change log buffer without requiring serialization between the multiple processes. For example, the persistent change log buffer may allocate different regions to different processes so that the different processes may write to the persistent change log buffer without coordination between the different processes.

In one embodiment, a non-volatile change log buffer is a remote resource with respect to a plurality of database instances of a shared memory database. Even when a database instance failure is encountered, persistence of a change record is guaranteed upon writing to the persistent change log buffer.

Change Records

Change log files may include individual change records. In one embodiment, change records are generated and stored in change log files as changes are made to the database. A change record includes data and/or metadata that describe one or more changes performed on a database. For example, a change record may specify one or more data block(s) of the database being modified and respective change vectors that describe the changes made to the data block.

Change records are usable to undo changes made to the database. For example, if a change to a database needs to be undone, such as when a transaction is not committed, one or more change records may be processed to determine the necessary steps to undo the change described in the change record. Likewise, a change record may be used to reconstruct changes made to the database. For example, if a data file needs to be restored, a backup of the data file can be loaded, and one or more change records may be processed to redo changes made to the database since the backup.

Change records can be stored in one or more change log files. Change log files may be shared between one or more RBDMS instances. Alternatively and/or in addition, an RDBMS instance may maintain one or more dedicated change log files.

Logical Timestamp

Change records may also include a logical timestamp. In one embodiment, the logical time stamps are generated using a shared logical clock service that assigns a logical timestamp to each change record. As used herein, the term "logical timestamp" includes any value usable to uniquely identify an order between the value and another value assigned to another logical timestamp. A logical timestamp may be based on an actual time, an order, or any other data usable to indicate an order. A logical timestamp may be included in one or more change records and/or an associated header or other metadata. In one embodiment, the logical timestamp associated with a particular change record is also associated with the data block modified by the change record.

A logical timestamp may be associated with a change record as well as any other event that has a corresponding time in the logical time space. For example, a failure event or a recovery event may be assigned a logical timestamp that is comparable with a logical timestamp of a change record. An example of a logical timestamp is a system change number (SCN) generated by a shared logical clock service in the Oracle RAC database system. In a multi-instance database environment, such as Oracle Real Application Clusters ("RAC"), the logical timestamp may be propagated across database instances.

Persistent Change Log Buffer

FIG. 1 is a block diagram depicting an embodiment of a persistent change log buffer. A persistent change log buffer 102 is an allocated region of non-volatile memory. Change records generated by one or more processes executing one or more transactions with respect to a database are copied into the persistent change log buffer 102. In one embodiment, the persistent change log buffer 102 is a circular buffer. Circular buffer processing and reuse is described in greater detail hereafter. A database may have multiple persistent change log buffers 102. When multiple persistent change log buffers 102 are implemented in a database system, contention is reduced.

A process executing a transaction enters a buffer entry 104 into the persistent change log buffer 102 to record a set of one or more changes made to the database during the transaction. In one embodiment, a buffer entry 104 includes a change record header 106 and a change record 110. The change record 110 may be formatted as a change record that can be directly copied into a change log file on disk. In other words, the change record 110 may comply, without additional modification, with the expected format for change records in the change log file on disk, while the change record header 106 may contain any additional metadata relating to the change record 110.

In one embodiment, the non-volatile memory is guaranteed to be atomic at a certain atomic chunk size that is large enough to hold a change record header 106. For example, if the non-volatile memory is atomic at a 64 byte atomic chunk size, a change record header 106 may be up to 64 bytes in an embodiment.

The change record header 106 includes record identifying data 108 that indicates that the current atomic chunk is the first chunk of a buffer entry 104. In one embodiment, a deferred writer process processes the buffer entries 104 in a region of the persistent change log buffer 102 and writes the change records 110 to a change log file on disk. The deferred writer process processes each atomic chunk in the region to determine whether a buffer entry 104 is present. When the record identifying data 108 is missing or otherwise indicates that no buffer entry 104 begins at the current atomic chunk, the deferred writer process moves on to the next atomic chunk in the persistent change log buffer 102. When the record identifying data 108 indicates that the current atomic chunk is the first atomic chunk of a buffer log entry 104, the deferred writer process processes the buffer entry 104. The deferred writer process shall be described in greater detail hereafter.

In one embodiment, change record header 106 includes size information indicating a size of the change record 110 in the buffer entry 104. The deferred writer process uses this information to determine the appropriate portion of the data stored in the persistent change log buffer 102 to write to the change log file, then moves on to the next atomic chunk following the change record 110.

In one embodiment, the record identifying data 108 is a particular bit pattern in a first portion of the change record header 106, such as the first byte or the first bit. In one embodiment, the persistent change log buffer 102 is zeroed out when initialized, and the deferred writer process zeroes out all atomic chunks of a buffer entry 104 after writing the change record 110 of the buffer entry 104 to the change log file on disk. Alternatively and/or in addition, the deferred writer process zeroes out the portion of each atomic chunk of buffer entry 104 that corresponds to the first portion of the change record header 106 in which the record identifying data 108 is expected if a change record header 106 is written to the atomic chunk.

Change Record Generation into Persistent Change Log Buffer

Buffer entries 104 containing change records 110 are generated by one or more processes that execute transactions that modify a corresponding database. In one embodiment, a process executing a transaction creates change records 110 in private memory that is assigned to the process. The change record 110 is then copied from the private memory to the persistent change log buffer 102 along with change record header 106 as a buffer entry 104. Once a change record 110 is copied into the persistent change log buffer 102, the change record 110 is durable. Thus, persistence of the change record 110 is decoupled from its final entry into the change log file, and is decoupled from synchronization with other concurrent change record generation that also needs to be persisted by entry into the change log file. Thus, log file synchronization delay is eliminated.

The buffer entries 104 in the persistent change log buffer 102 may be written from the persistent change log buffer 102 to change log files on disk in a deferred manner. The process executing the transaction does not need to wait for the change record 110 to be further processed once the buffer entry 104 is created.

When a transaction commits, a change record is generated and persisted that indicates the act of committing the transaction, referred to hereafter as the "transaction commit change record." The transaction commit can complete after the transaction commit change record is copied into the persistent change log buffer 102.

In one embodiment, when a process begins executing a transaction that has the potential to modify the database, the process is assigned an address space 118 within the persistent change log buffer 102. In one embodiment, the process executing the transaction includes a change record copy thread that copies the change records generated by the process from the private memory of the process to the persistent change log buffer 102 as a buffer entry 104.

Multiple processes executing multiple transactions may generate change records and copy the change records to the same persistent change log buffer 102. For example, a first process executing a first transaction may be assigned a first address space 118 of persistent change log buffer 102, and a second process executing a second transaction may be assigned a second address space 120 of persistent change log buffer 102. By assigning distinct address spaces 118-120 to each process that can generate change records, the processes may generate and copy change records into the same persistent change log buffer 102 without serialization of the copy operations from the different processes.

Integrating Persistent Change Log Buffer to Replace In-Memory Change Log Buffer

In one embodiment, a persistent change log buffer 102 is integrated into a database system to replace an in-memory change log buffer and function within an existing write-ahead logging mechanism that previously used the in-memory change log buffer. Integrating a persistent change log buffer 102 into such a database system allows for the continued usage of existing functionality built around the write-ahead logging mechanism, such as recovery, change record order enforcement mechanisms, logical timestamp assignment, and other functionality.

In one embodiment, a virtual in-memory change log buffer is used as a bridge between a process that generates redo records and the persistent change log buffer 102. The virtual in-memory change log buffer has no actual memory allocated to it. When a change record is generated by a process executing a transaction, the process uses existing functionality to synchronize concurrent generation and copying of change records. When the process copies a change record to the virtual in-memory change log buffer, the actual operation is directed to the persistent change log buffer 102 rather than the non-existent virtual in-memory change log buffer. In one embodiment, the change record is copied to the persistent change log buffer 102 by a copy thread that is similar in function to a thread that would have copied change records from private memory of a process executing a transaction to an in-memory change log buffer.

An atomic chunk size refers to the smallest unit of access for a computer-readable medium. The atomic chunk size may be inherent to the computer-readable medium, or may be set as a property of database management system or a file system. When a persistent change log buffer 102 is used to replace an in-memory change log buffer in an existing write-ahead logging mechanism, the virtual in-memory change log buffer utilizes an atomic chunk size based on the atomic chunk size of the non-volatile memory that stores the persistent change log buffer 102. In contrast, an in-memory change log buffer would have used a chunk size based on the disk storage that stores the change log files.

Current Write Progress Marker

In one embodiment, a current write progress marker 112 is persisted for each persistent change log buffer 102. The current write progress marker 112 indicates an offset within each persistent change log buffer 102. It is guaranteed that all change records 110 in buffer entries 104 below the current write progress marker 112 have been written to change logs by one or more deferred writer processes. The current write progress marker 112 moves forward as log entries 104 are processed by the deferred writer process.

In one embodiment, an upper boundary 114 is determined. The upper boundary 114 may be determined based on a position of the current write progress marker 112 within the persistent change log buffer 102. The upper boundary 114 may be further determined based on a size of the persistent change log buffer 102. For example, the upper boundary 114 may be the current write progress marker 112 plus half the size of the persistent change log buffer 102.

In one embodiment, it is enforced that no buffer entries 104 will be written above the upper boundary 114. This ensures that the persistent change log buffer 102 always includes a cleared region 116. For example, if a process that is executing a transaction attempts to generate a change record 110 and copy the change record 110 into the persistent change log buffer 102, the process will need to wait until the current write progress marker 112 is moved forward.

Writing Change Records from Persistent Change Log Buffer to Change Log File

To clear the persistent change log buffer 102 and make room for new buffer entries 104, change records 110 are written from the persistent change log buffer 102 to a change log file on disk. The write operation is referred to as a deferred write operation because the write operation is desynchronized from the operation of processes executing the transaction, including the execution of commit operations. More specifically, the deferred write operation is decoupled from the generation of change records 110 as changes are made to the database, and is also decoupled from transaction commit operations.

In one embodiment, a deferred writer process writes the change records 110 in one or more persistent change log buffers 102 to a change log file on disk. When a database system includes multiple persistent change log buffers 102, a separate deferred writer process may be assigned to each persistent change log buffer 102. In one embodiment, the deferred writer process resides on a node that is local to the persistent change log buffer 102 to eliminate network latency caused by reading from memory in a remote node. After successfully writing a change record 110 to the change log file, the deferred writer process clears the corresponding buffer entry 104 in the persistent change log buffer 102.

In one embodiment, a virtual in-memory change log buffer acts as a bridge to the persistent change log buffer 102 and replaces the in-memory change log buffer in an existing write-ahead logging mechanism. However, the virtual in-memory change log buffer is not allocated in memory. On the database instance where the transactions are executed, change records are generated into the virtual in-memory change log buffer. A process on the database instance synchronizes with processes generating the change records and obtains the ranges of the virtual in-memory change log buffer which have been copied into, and notifies the deferred writer process to write the redo changes from the corresponding ranges of the persistent change log buffer 102.

In one embodiment, a deferred writer process scans the persistent change log buffer 102 from the current write progress marker 112 to the upper boundary 114. The deferred writer process evaluates each atomic chunk of the persistent change log buffer 102 to determine if the current atomic chunk contains a header 106 of a buffer entry 104. For example, the deferred writer process may evaluate each atomic chunk of the persistent change log buffer 102 to determine if the atomic chunk is the beginning of a buffer entry 104. In one embodiment, the change record header 106 fits within one atomic chunk, and the change record header 106 is detected by the deferred writer process based on record identifying data 108.

When a buffer entry 104 is detected, the deferred writer process writes the change record 110 in the buffer entry 104 to the change log file on disk. In one embodiment, change record header 106 includes size information indicating a size of the change record 110 in the buffer entry 104. The deferred writer process uses this information to determine the appropriate portion of the data stored in the persistent change log buffer 102 to write to the change log file, then moves on to the next atomic chunk following the change record 110.

After successfully writing the change record 110 to the change log file, the deferred writer process clears the corresponding buffer entry 104 from the persistent change log buffer 102, such as by zeroing out each atomic chunk of the buffer entry 104.

Online Change Log File Switch

In some existing database logging mechanisms, change records are written to an online change log file. The online change log file may need to be switched when the online change log file is full, or upon occurrence of another event. In an online change log file switch, the current online change log file is taken offline and another change log file is brought online. For example, the current online change log file may be archived. Offline change log files are still accessible, but change records are no longer written to offline change log files.

Because the persistent change record buffer 102 makes the change record persistent upon entry to the buffer rather than entry into the online change log file, the switching of the online change log file is no longer a synchronization point for transaction-executing processes. In other words, when the change records are non-persistently stored (e.g. in an in-memory buffer), the transaction commit must wait for the online change log file to be switched because a transaction commit cannot be completed until the corresponding change records are made persistent. Thus, when in-memory change log buffers are used, any necessary online change log file switch must be completed before a transaction commit change record can be written and persisted to complete the transaction commit.

For compatibility with existing systems that are integrated with online change log files and online change log file switching mechanisms, the online change log file switch may be adapted to function with the persistent change record buffer 102. Several scenarios for switching an online change log file are described hereafter.

In typical operation, an online change log file switch occurs when the online change log file is full. In one embodiment, when a deferred writer process determines that there is not enough space left in the online change log file, it generates a notification which causes the database system to initiate an online change log file switch. After the online change log file switch, any deferred writer processes will write the change records from the persistent change log buffer 102 to a new online change log file.

An online change log file switch may also be performed upon a user request or a request by another database system component. For example, a backup or recovery process may internally request an online change log file switch. Typically, the reason for such a request is to make sure all change records generated so far are immediately archived. In one embodiment, in response to a request to perform an online change log file switch, all current change records related to pending transactions are copied to the persistent change log buffer 102. The online change log file is switched after these change records 110 are written from the persistent change log buffer 102 to the online change log file.

In an embodiment of a database system with multiple persistent change log buffers, one or more deferred writer processes finish writing these change records from their associated persistent change log buffers 102 to the online change log file. The online change log file is switched after all deferred writer processes have finished writing the change records up to the logical time associated with the request to switch the online change log file. Each deferred writer process will hold off on writing later-generated change records from its associated persistent change log buffer 102 until after the online change log file switch.

Shared-Disk Database Embodiment

A shared-disk database includes multiple database instances configured to access a single database. One example of a shared-disk database is the Oracle Real Application Clusters (RAC). Oracle RAC includes multiple servers or hosts connected to each other by a high bandwidth, low latency interconnect. The interconnect may be a private network that connects all of the instances of the shared-disk database. The system appears as a single database server to end users and applications. Various techniques provided herein may apply to multiple-instance database configurations. Furthermore, the techniques provided herein, as applied to multiple instance database configurations, are not limited to Oracle RAC, and may apply to any proprietary and/or standardized shared-disk database architecture.

In one embodiment implemented on a shared-disk database system, one or more persistent change log buffers 102 are located remotely from one or more database instances of the shared-disk database. Thus, the failure or other unavailability of a particular database instance does not affect the persistency or availability of change records generated by the unavailable database instance. In one embodiment, the one or more persistent change log buffers 102 are located in non-volatile memory that is local to one or more deferred writer processes and/or one or more online change log files on disk. Such a configuration eliminates network latency that would otherwise occur due to reading from memory in a remote node.

Recovery

When a database system encounters a failure of one or more components, the database must be recovered to return the database to normal operation. Recovery may involve restoring a backup of all or part of the database to either the current logical time or another point in time. In this case, changes that occurred since the backup must be reapplied. These changes are applied from change records, including change records in online change log files and/or archived change log files. At any given time that a failure is encountered, recovery processes must be able to determine the status of any modifications to the database based on the change records. The change records are essential to determining the state of the database so that the recovery processes can proceed accordingly.

One type of failure involves the failure of a database instance that executes transactions that potentially modify the database. The change records generated by such a database instance will be present in change log files as well as in the persistent change log buffer 102. In one embodiment, a recovery process scans the persistent change log buffer 102 for complete change records 110, such as by scanning each atomic chunk in one or more regions 118-120 assigned to the database instance for record identifying data 108. The recovery process then writes the change records 110 associated with complete buffer entries 104 in the corresponding regions 118-120 into the online change log file. The recovery process also clears the persistent change log buffer 102 after transferring the change records 110 to the online change log file.

After the recovery process finishes transferring the change records 110 from the persistent change log buffer 102 to the online change log file, standard recovery procedures can be executed based on the change log files, including any online change log file or archived change log file. At the end of the recovery process, all change records 110 in the persistent change log buffer 102 generated by the failed database instance will have been flushed to the change log files, and the persistent change log buffer 102 will be empty.

Virtual Online Change Log Files

In one embodiment, the size of the persistent change log buffer 102 is large enough such that the need to write buffered change records 110 to online change log files is eliminated, thereby avoiding the I/O cost of writing large amounts of data. For backwards compatibility, a virtual online change log file may be maintained. The buffer entries 104 containing change records 110 remain in the persistent change log buffer 102, and the virtual online change log file on disk is populated with change record metadata indicating the location of the change record 110 within the persistent change log buffer 102. Thus, the virtual online change log files are still usable, by other database system mechanisms that rely on online change log files, to access the change records in the persistent change log buffer 102 based on the metadata written to the virtual online change log files.

In one embodiment, the persistent change log buffer 102 is twice the size of the online change log file as specified by the database system parameters. In one embodiment, a mechanism is included to archive the virtual online change log file. When a virtual online change log file is archived, the metadata stored in the virtual online change log file is used to access and copy the change records 110 from the persistent change log buffer 102 into an archive change log file.

Example Process

Figure 2:
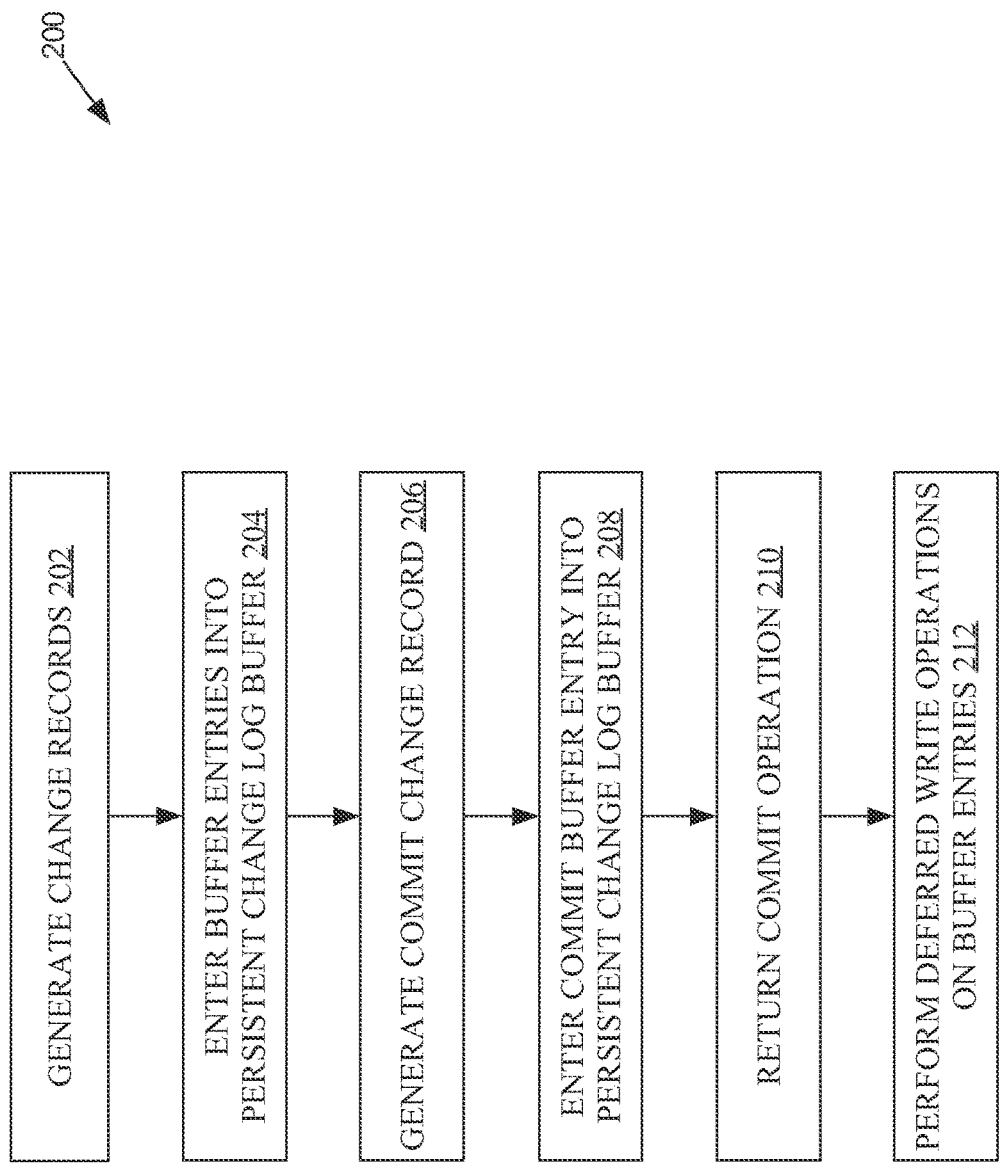
FIG. 2 is a flow diagram that illustrates an embodiment of a process for generating and persisting change records.

FIG. 2 is a flow diagram that illustrates an embodiment of a process for generating and persisting change records. Process 200 may be performed by one or more computing devices and/or processes thereof. For example, one or more blocks of process 200 may be performed by one or more computer systems 300.

At block 202, change records are generated in a database system. In one embodiment, change records are generated by a process that is executing a transaction that potentially makes changes to a database.

At block 204, the change records are entered into a persistent change log buffer. In one embodiment, each buffer entry comprises a change record and a buffer entry header. The persistent change log buffer is allocated in non-volatile memory. In one embodiment, the persistent change log buffer is allocated in non-volatile memory that belongs to a computing node that is remote from a node that executes a database instance that is executing the transaction.

At block 206, a commit change record is generated. The commit change record may be generated when the transaction is ready to commit. When the transaction is ready to commit, a commit operation is initiated, such as by the process executing the transaction.

At block 208, a commit buffer entry is entered into the persistent change log buffer. In one embodiment, the commit buffer entry comprises the commit change record and a buffer entry header.

At block 210, the commit operation returns. The commit operation is desynchronized from the writing of any change records to disk, and is also desynchronized from other processes that execute transactions. Thus, the commit operation returns independently of recording change records of the transaction, including the commit change record, in any change record log files on disk.

At block 212, deferred write operations are performed on buffer entries entered in the persistent change record buffer. The deferred write operations may be performed by one or more deferred writer processes. In one embodiment, the deferred write operation comprises writing one or more change records to a change record log file on disk and clearing the corresponding buffer entries from the persistent change log buffer. In another embodiment, the deferred write operation comprises writing, to a virtual change log file, change record metadata indicating one or more locations of the one or more change records within the persistent change log buffer. When the virtual change log file is used, the log entries are not cleared from the persistent change log buffer.

Example Implementation System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
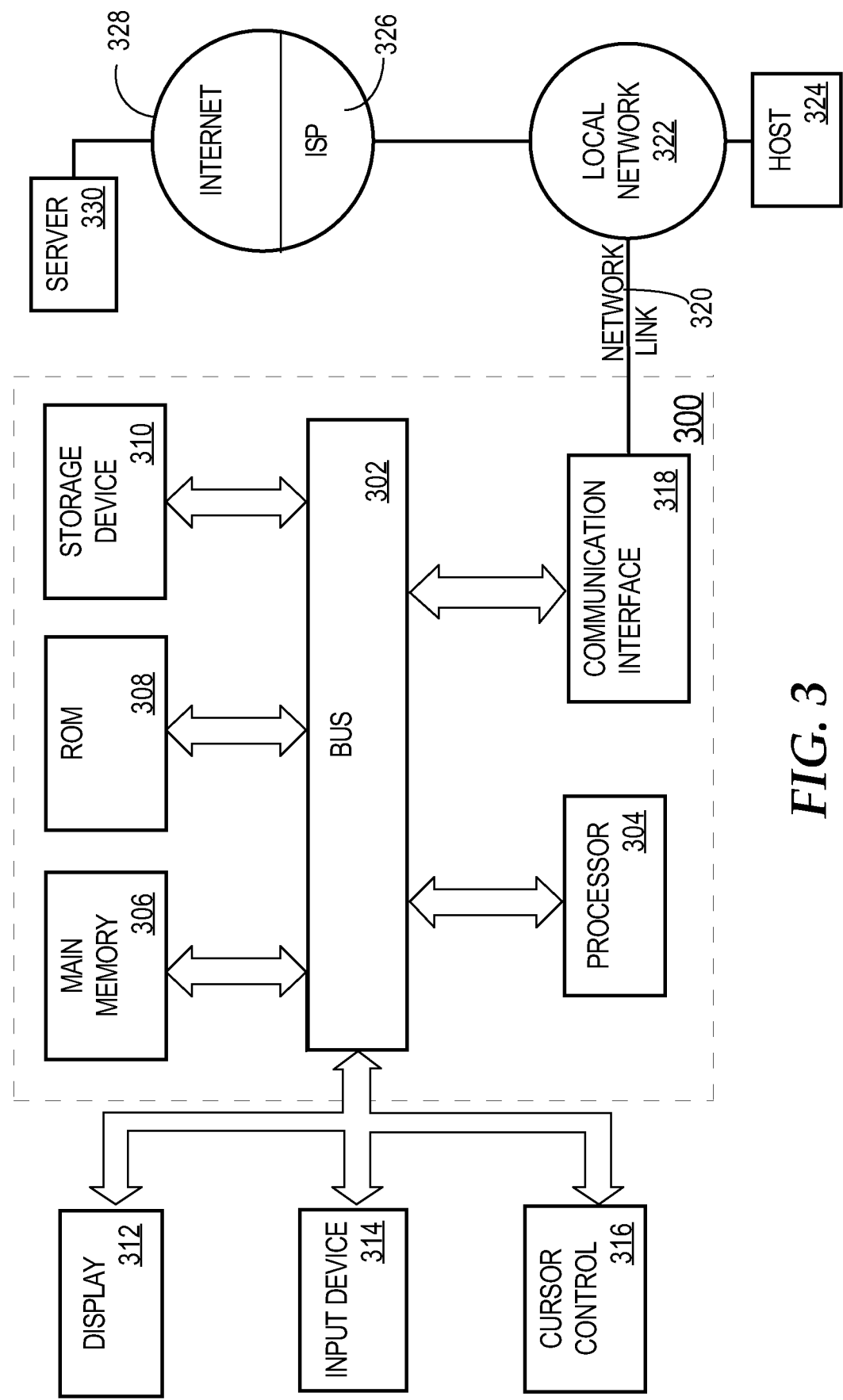
FIG. 3 illustrates a computer system upon which one or more embodiments may be implemented.

For example, FIG. 3 is a block diagram that depicts a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating one or more change records corresponding to a database transaction, said one or more change records describing changes to one or more data blocks;
    entering one or more buffer entries comprising the one or more change records into a persistent change log buffer that is allocated in byte-addressable non-volatile memory;
    persistently storing a current write progress marker, wherein all buffer entries in the persistent change log buffer that are below the current write progress marker have been written to one or more change record log files;
    performing a commit operation by at least:
        generating a commit change record corresponding to the database transaction;
        entering a commit buffer entry comprising the commit change record into the persistent change log buffer; and
        returning, by the commit operation, without waiting for the commit change record to be recorded in a change record log file;
    after performing said commit operation, writing through a block input/output interface said commit change record to said change record log file; and
    wherein the method is performed by one or more computing devices.

2. The method of claim 1, wherein the persistent change log buffer is allocated in a non-volatile memory of a computing node that is remote from a node executing a database instance that is executing the database transaction.

3. The method of claim 1, further comprising:
    determining an upper boundary based on a position of the current write progress marker within the persistent change log buffer and a size of the persistent change log buffer;
    wherein no buffer entry is entered into the persistent change log buffer above the upper boundary.

4. The method of claim 3, further comprising, when the upper boundary indicates that no space is available in the persistent change log buffer, delaying entry of the one or more buffer entries until the current write process marker is moved forward.

5. The method of claim 1, further comprising:
    performing a deferred write operation on one or more entered buffer entries in the persistent change log buffer, wherein the deferred write operation comprises writing one or more change records, corresponding to the one or more entered buffer entries, to the change record log file and clearing the one or more entered buffer entries from the persistent change log buffer;
    wherein the deferred write operation is not synchronized with execution of commit operations.

6. The method of claim 1, further comprising:
    performing a deferred write operation on one or more entered buffer entries in the persistent change log buffer, wherein the deferred write operation comprises writing, to a virtual change log file, change record metadata indicating one or more locations of the one or more entered change records within the persistent change log buffer;
    wherein the deferred write operation is not synchronized with execution of commit operations.

7. The method of claim 1,
    wherein the one or more change records are generated by a first process executing the database transaction;
    wherein the first process is assigned a first address space within the persistent change log buffer;
    wherein the one or more buffer entries and the commit buffer entry are entered in the first address space of the persistent change log buffer.

8. The method of claim 7, further comprising:
    assigning a second address space within the persistent change log buffer to a second process executing a second transaction;

wherein the second process enters one or more second log buffer entries into the second address space of the persistent change log buffer;

wherein the first process uses the first address space and the second process uses the second address space concurrently without serialization between the first process and the second process.

9. The method of claim 1, further comprising:

detecting a failure of a database instance generating and entering change records into the persistent change log buffer;

scanning, by a recovery process, the persistent change log buffer to detect unwritten change records in the persistent change log buffer that were generated by the database instance;

writing the unwritten change records to the change record log file;

clearing the unwritten change records from the persistent change log buffer.

10. One or more non-transitory storage media storing sequences of instructions that, when executed by one or more computing devices, cause:

generating one or more change records corresponding to a database transaction, said one or more change records describing changes to one or more data blocks;

entering one or more buffer entries comprising the one or more change records into a persistent change log buffer that is allocated in byte-addressable non-volatile memory;

persistently storing a current write progress marker, wherein all buffer entries in the persistent change log buffer that are below the current write progress marker have been written to one or more change record log files;

performing a commit operation by at least:
  generating a commit change record corresponding to the database transaction;
  entering a commit buffer entry comprising the commit change record into the persistent change log buffer; and
  returning, by the commit operation, without waiting for the commit change record to be recorded in a change record log file; and after performing said commit operation, writing through a block input/output interface said commit change record to said change record log file.

11. The non-transitory storage media of claim 10, wherein the persistent change log buffer is allocated in a non-volatile memory of a computing node that is remote from a node executing a database instance that is executing the database transaction.

12. The non-transitory storage media of claim 10, wherein the sequences of instructions include instructions that, when executed by the one or more computing devices, cause:

determining an upper boundary based on a position of the current write progress marker within the persistent change log buffer and a size of the persistent change log buffer;

wherein no buffer entry is entered into the persistent change log buffer above the upper boundary.

13. The non-transitory storage media of claim 12, wherein the sequences of instructions include instructions that, executed by the one or more computing devices, cause:

when the upper boundary indicates that no space is available in the persistent change log buffer, delaying entry of the one or more buffer entries until the current write process marker is moved forward.

14. The non-transitory storage media of claim 10, wherein the sequences of instructions include instructions that, when executed by the one or more computing devices, cause:

performing a deferred write operation on one or more entered buffer entries in the persistent change log buffer, wherein the deferred write operation comprises writing one or more change records, corresponding to the one or more entered buffer entries, to the change record log file and clearing the one or more entered buffer entries from the persistent change log buffer;

wherein the deferred write operation is not synchronized with execution of commit operations.

15. The non-transitory storage media of claim 10, wherein the sequences of instructions include instructions that, when executed by the one or more computing devices, cause:

performing a deferred write operation on one or more entered buffer entries in the persistent change log buffer, wherein the deferred write operation comprises writing, to a virtual change log file, change record metadata indicating one or more locations of the one or more entered change records within the persistent change log buffer;

wherein the deferred write operation is not synchronized with execution of commit operations.

16. The non-transitory storage media of claim 10, wherein generating the one or more change records comprises generating the one or more change records by a first process executing the database transaction;

wherein the sequences of instructions include instructions that, when executed by the one or more computing devices, further cause performance of assigning the first process a first address space within the persistent change log buffer;

wherein entering the one or more buffer entries comprises entering the one or more buffer entries in the first address space of the persistent change log buffer;

wherein entering the commit buffer entry comprises entering the commit buffer entry in the first address space of the persistent change log buffer.

17. The non-transitory storage media of claim 16, wherein the sequences of instructions include instructions that, when executed by the one or more computing devices, cause:

assigning a second address space within the persistent change log buffer to a second process executing a second transaction;

wherein the second process enters one or more second log buffer entries into the second address space of the persistent change log buffer;

wherein the first process uses the first address space and the second process uses the second address space concurrently without serialization between the first process and the second process.

18. The non-transitory storage media of claim 10, wherein the sequences of instructions include instructions that, when executed by the one or more computing devices, cause:

detecting a failure of a database instance generating and entering change records into the persistent change log buffer;

scanning, by a recovery process, the persistent change log buffer to detect unwritten change records in the persistent change log buffer that are generated by the database instance;

writing the unwritten change records to the change record log file;

clearing the unwritten change records from the persistent change log buffer.

* * * * *